United States Patent [19]
Wood

[11] 3,909,139
[45] Sept. 30, 1975

[54] METHOD AND MEANS FOR INSPECTING BORE SURFACES IN ELONGATE ARTICLES

[75] Inventor: George P. Wood, San Diego, Calif.

[73] Assignee: The United States of America as represented by the Secretary of the Navy, Washington, D.C.

[22] Filed: Dec. 17, 1973

[21] Appl. No.: 425,382

[52] U.S. Cl. ................................ 356/241; 356/244
[51] Int. Cl.² .................. G01N 21/16; G01N 21/32
[58] Field of Search ............ 356/241, 244; 250/224

[56] References Cited
UNITED STATES PATENTS
1,775,452  9/1930  Fisher ................................ 356/241
3,329,059  7/1967  McCormac ......................... 356/241

*Primary Examiner*—Vincent P. McGraw
*Attorney, Agent, or Firm*—R. S. Sciascia; G. J. Rubens

[57] ABSTRACT

The inspection of bore surfaces of elongate articles, such as the spar cavities of helicopter blades, is accomplished by moving the article relative to and telescopically over a longitudinally fixed conventional borescope or the like in a manner that enables the operator to remain seated at his inspection station while controlling the movement of the article, ensuring an easier, quicker and more thorough inspection.

7 Claims, 5 Drawing Figures

METHOD AND MEANS FOR INSPECTING BORE SURFACES IN ELONGATE ARTICLES

BACKGROUND OF THE INVENTION

This invention relates to inspection method and apparatus, and particularly to such method and apparatus as applies to the inspection of bore surfaces in elongate hollow articles for defects.

Various devices are employed in testing the bore surfaces of hollow articles such as helicopter blades, gun barrels, solid grain propellant, etc. In all cases, the inspection device, i.e., borescope, is inserted into the fixed article, and gradually advanced therein by the inspector while being simultaneously rotated to enable the entire bore surface to be checked for cracks and other imperfections.

In those instances where the article is very long, such as a 27 foot helicopter blade, the inspector has to manually move the borescope gradually into the article while at the same time trying to scan the surface through the borescope. Moving the borescope necessitates the operator moving his inspection station, i.e., chair, many different times and also adjusting the length of the borescope, a practice which interrupts the inspection process. This intermittent inspection procedure produces an erratic inspection pattern that may cause some defects to be inadvertently overlooked. This practice also results in eye strain to the operator in simultaneously trying to sight through the borescope while it is being moved into the article.

SUMMARY OF THE INVENTION

The novel method and apparatus for inspecting bore surfaces of elongate hollow articles consists primarily in movably supporting the article on carriages which ride on a fixed stand. Supported on the stand is a longitudinally fixed inspection device of conventional design, such as borescope, which is adjustably aligned with the article bore. The operator can remain seated at his viewing station while controlling the movement of the article over the borescope.

The drive means for the article is variable controlled at the operator's station at the same time the operator is inspecting the bore surface through the borescope. Means are provided for intermediately and adjustably supporting the elongate sighting device outside and inside the article bore.

STATEMENT OF THE OBJECTS OF INVENTION

A principal purpose of this invention is to provide a method and apparatus for improving the quality of the inspection of bore surfaces in elongate hollow objects.

Another important object of this invention is minimize fatigue of, and enhance the comfort to, the operator during the inspection procedure, while at the same time expediting the inspection process.

Other objects, advantages and novel features of the invention will become apparent from the following detailed description of the invention when considered in conjunction with the accompanying drawings.

DESCRIPTION OF THE PREFERRED EMBODIMENT

Figure 1:
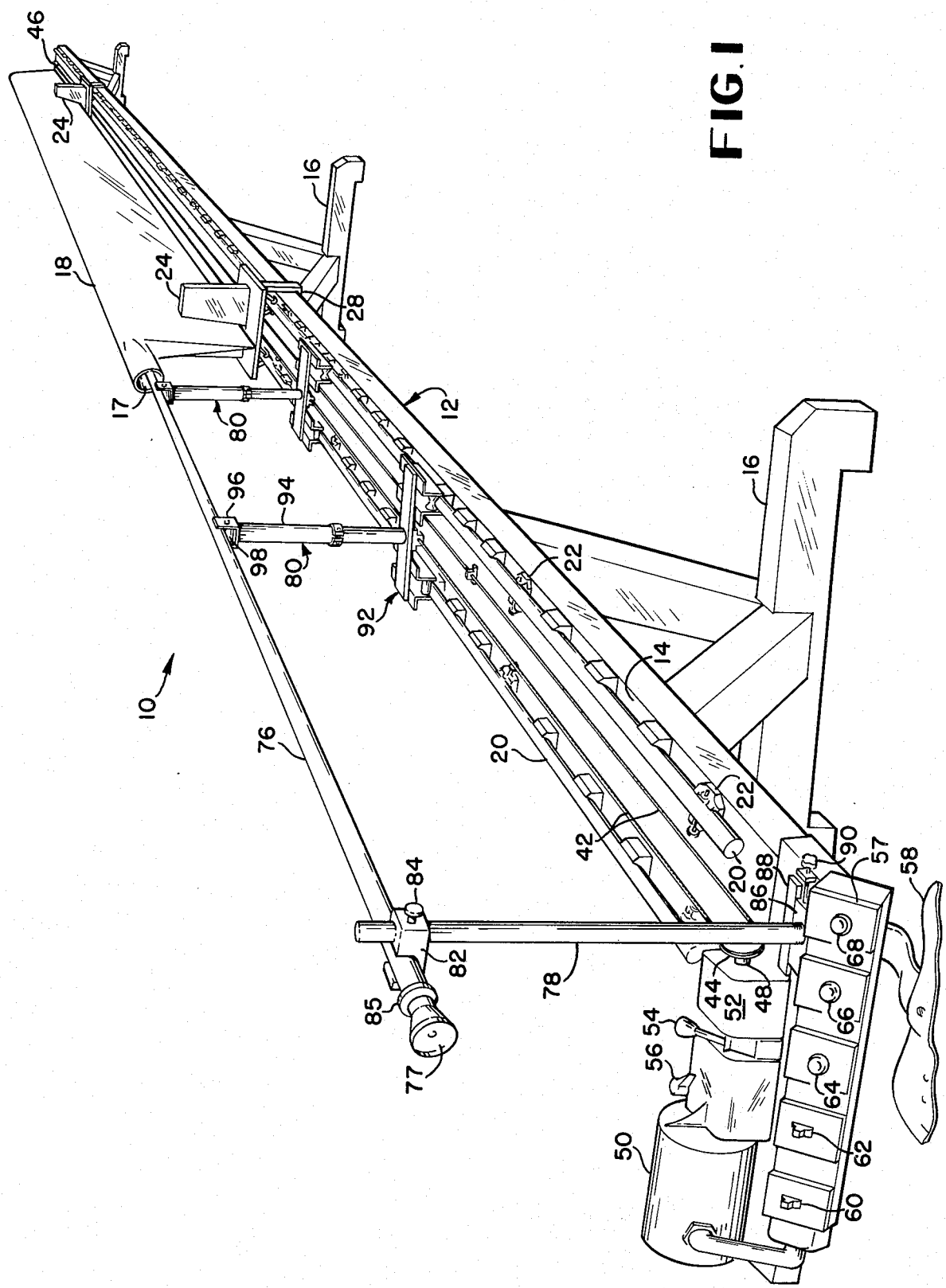
FIG. 1 is a perspective view of the inspection apparatus taken at the operators station showing a helicopter blade supported in a position in which the hollow spar portion can be visually inspected for defects through a borescope.
Figure 2:
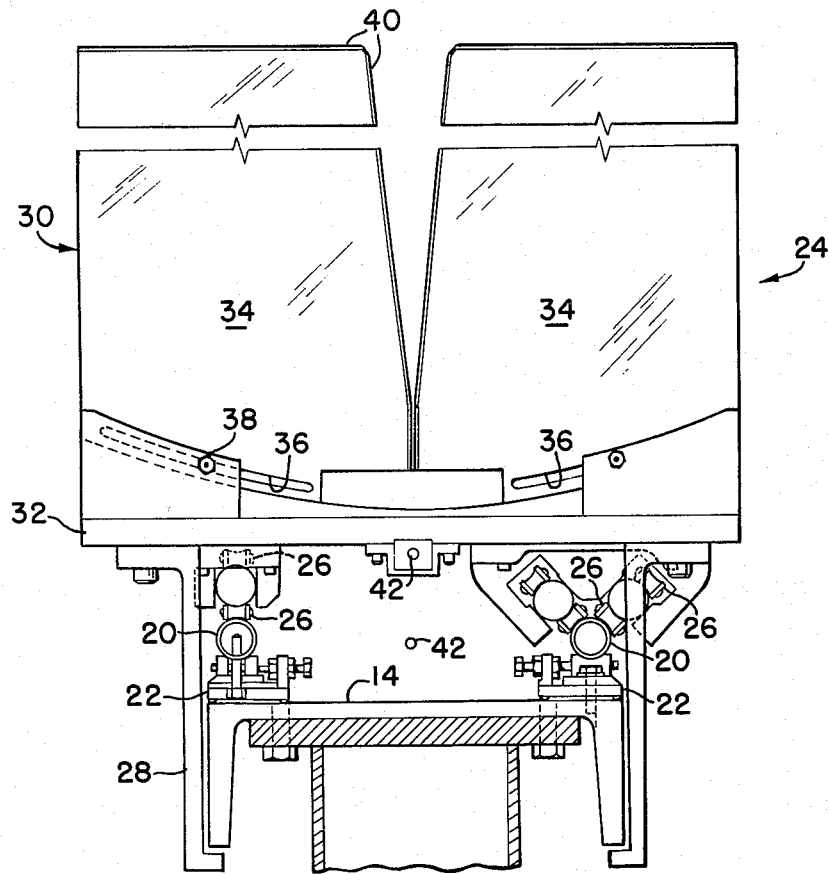
FIG. 2 is a cross-sectional view of the inspection stand taken along line II—II showing a carriage and saddle for supporting the helicopter blade on its trailing edge, the blade being removed.

Referring to the drawings where like reference numerals refer to similar parts throughout the figures there is shown in FIG. 1 a novel article inspection apparatus 10 comprising an elongate stand 12 having a table platform 14 from which depend supporting legs 16. For reasons that will be obvious, the length of the stand is slightly over twice the length of the bore surface of the elongate article to be inspected. In the preferred embodiment, apparatus 10 is used for inspecting the bore surface of a hollow spar 17 of a helicopter blade 18. For such use stand 12 is approximately 70 feet in length to accommodate blades of different lengths.

A pair of spaced cylindrical rails 20 are longitudinally mounted by spaced supports 22 welded on platform 14, which rails extend for substantially the length of stand 12. Rails 20 are of a commercially available "Thompson Roundway" track design which can be levelled and adjusted to a tolerance of 0.001 inch.

The article to be inspected, i.e., helicopter blade 18, is movably supported on apparatus 10 by a pair of fore and aft spaced carriages or trams 24, each having four "Thompson Roundway" roller bearings 26 that engage rails 20. This type of bearing is smooth in operation and causes very little or no vibration when in motion, which is obviously desirable for an optical sighting apparatus. A depending bracket arm 28 is mounted on one side of each tram to extend under platform 14 to guide and retain the trams during movement on the rails.

A cradle assembly 30 is bolted to a base plate 32 of each tram, the cradle consisting of two arms plates 34 adjustably spaced apart snugly to receive the trailing edge of blade 18 therebetween. The base of each arm 34 has a curved slot 36 to receive a clamping bolt 38 so that the arms can be transversely adjustable on base plate 32 to accommodate blades of different thicknesses and the built-in twist that is usually designed into the blades. The upper and sloping facing edges of the respective arms may be provided with a teflon liner 40 to protect the blade skin. The weight of the blade on the trams will maintain them in their adjusted spaced relationship.

Trams 24 are pulled back and forth on the rails, with blade 18 supported in cradles 30, by a cable 42 having its ends adjustably connected to the trams. The cable rides over a pair of pulleys 44 and 46 at opposite ends of the stand. Pulley 44 is a driving pulley being mounted on a shaft 48 of a motor 50 through a variable speed regulator 52 having a control lever 54. The speed of the power train can be varied by the operator through the regulator from zero speed up to 135 r.p.m.'s. A reversing lever 56 enables the operator to reverse the drive system to return the tram supported blade back to the initial starting position after an inspection run.

A control panel 57 is mounted on the inspector's end of stand 12 accessible to the operator's seat 58, and is fitted with an "off" and "on" motor switch 60, a "Jog" switch 62, a "Power-On" green light 64, an "Approaching End of Run" amber warning light 66, and a "Deactivates the Power" red light 68. Jog switch 62 may be used to control the movement of the tram through the final several feet of movement when light 66 is activated.

Pulley 46 is a driven pulley and is mounted on a plate 70 slidably positioned between a pair of spaced guides 72 supported on the remote end of stand 14, by an adjustable screw and handle assembly 74, by which means the tension on cable 42 can be adjusted.

An inspection device, such as a conventional borescope 76 having an eye piece 77 is supported on stand 12 in a vertically and horizontally aligned position with the blade spar cavity 17 by means of a fixed support 78 at the operators station, and a plurality of movable supports 80. Fixed support 78 rotatably supports the end of borescope 76 at adjustable eye piece 81 through a U-shaped slidable clamp 82 which is adjustable vertically by a locking knob 84 to enable the borescope to be centered with spar bore 17. A knurled knob 85 on the borescope enables the latter to be rotated 360° about its longitudinal axis at each inspection station within the spar. The base of support 78 is attached on a plate 86 slidable in transverse guides 88 and adjustable transversely to the stand through an adjusting screw and handle assembly 90 horizontally to align the borescope with the helocopter blade core 17.

Figure 3:
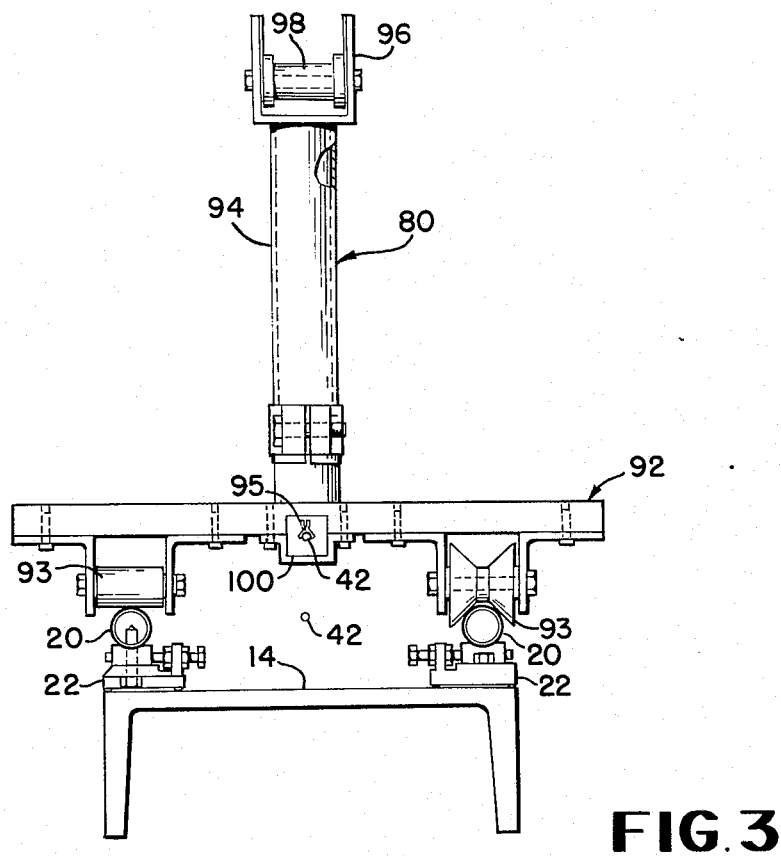
FIG. 3 is a cross-sectional view of the inspection stand taken along line III—III showing a saddle for vertically and slidably supporting an intermediate portion of the inspection device at points outside the blade.
Figure 5:
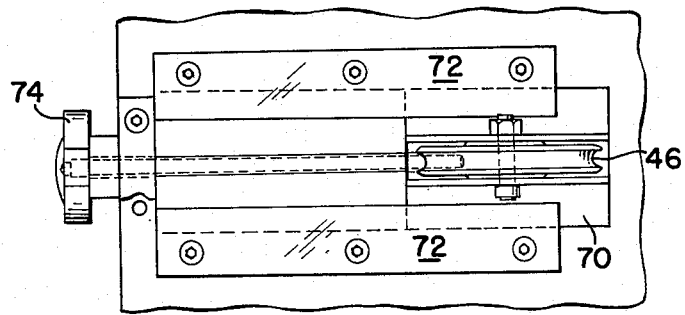
FIG. 5 is a top plan view of the remote end of the stand showing the adjustable mounting of the follower pulley of the carriage cable drive.

Each movable support 80 (FIG. 3) comprises a carriage 92 having four rollers 93 of a type previously described for engaging rails 20. A vertically adjustable telescopic standard 94 is mounted at its lower end to the carriage, and terminates at its upper end in a U-shaped bracket 96 for supporting a roller 98 on which rests an intermediate portion of borescope 76. The undercarriage has bolted thereto a guide 100 through which is slidably threaded the upper run of cable 42. A simple clamping means, such as an alligator clip 95, can be used to detachably secure support to the cable, so that the latter can follow the borescope as it is gradually inserted into the bore surface of the blade until the support abuts the forward end of the blade after which time the support remains stationary and the cable slips through guide 100 as it drives the cradle carriages.

Figure 4:
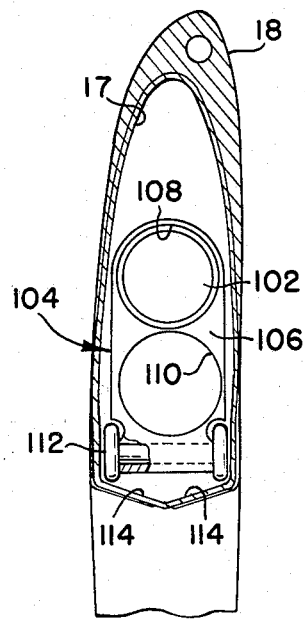
FIG. 4 is a cross-sectional view of the leading edge of the helicopter blade showing a caddy for slidably supporting and centering the inspection device within the hollow blade spar.

As shown in FIG. 4, the scanning end 102 of the borescope over which the blade bore 17 is moved, is supported and centered therein to eliminate sag by one or more longitudinal spaced caddies 104 detachably secured around the borescope. Caddy 104 consists of a body 106 having one or more apertures 108 and 110 into which the borescope may alternatively be inserted during the inspection process to view different portions of the surface. A pair of nylon rollers 112 are mounted on the base of body 106 for rolling engagement with the flat bore surfaces 114.

Borescope end 102 is of conventional design being constructed to be rotated about the longitudinal axis of the borescope to scan bore surface 17 for the existence of cracks or other defects. It is obvious that other types of inspection devices other than a borescope 76 may be employed if desired, such as a fluoroscope or other x-ray device, or a miniature TV camera probe or the like.

The inspection operation of the hollow helicopter blade 18 or similar article is apparent from the drawings. The blade is rested on trams 24 with the leading edge upward, and the trans suitably spaced apart depending on the blade length. Fixed saddle support 78 and movable saddle supports 80 are adjusted in height so that borescope 76 is axially aligned with blade bore 17. The inspection procedure can be initiated with the blade at either end of stand 12. It can be assumed that as shown in FIG. 1, the inspection procedure is commenced at the hub end of the blade, where the tram-mounted blade is in a furthermost position from the operators station 58. The operator controls the movement of the tram supported blade toward himself by manipulating control lever 54, after he has completed the circumferential sweep of the bore surface by rotating the borescope around its axis.

As the blade is moved over the borescope, the leading tram successively abutts each movable support 80, which normally travel with cable 42, causing supports 80 to pile up against each other as the cable slips through clip 95 on the supports. When the trams are returned to the initial starting position, the operator judiciously spaces the movable supports as the inspection device is withdrawn from the blade fixing the supports in position with respect to the cable by clips 95.

As the leading tram reaches the last several feet of travel, suitably positioned limit switches, now shown, energize warning light 66 and the drive can be controlled by jog switch 62 until the end of travel when the power is deactivated as indicated by red light 68.

An important feature of this invention is that the operator need not leave his station nor interrupt his sighting through the borescope at any time during the entire inspection run. In addition to the advantage of greatly expediting the inspection operation, the invention apparatus reduces eye strain as well as boredom and fatigue to the operator by allowing him to remain comfortably seated at the borescope station. Since the inspection operation is not repeatedly interrupted, a more thorough and accurate inspection is assured minimizing the likelihood of inspection gaps.

It is apparent that the borescope is representative of only one type of inspection device that can be employed and that a x-ray device, or miniature television camera device could be used for the purpose of this invention.

Obviously many modifications and variations of the present invention are possible in the light of the above teachings. It is therefore to be understood that within the scope of the appended claims the invention may be practiced otherwise than as specifically described.

What is claimed is:

1. A method of inspecting the bore surface of a very long elongate hollow helicopter blade with a bore inspection device comprising the steps of:
    fixing said inspection device in a longitudinally stationary condition to enable an inspector to remain in a seated position throughout the inspection process;
    and longitudinally moving only said blade relative to said inspection device in predetermined increments so that the latter is telescopically inserted within the bore of said blade.

2. Apparatus for inspecting the bore surface of a very long elongate hollow article comprising:
a longitudinal floor stand;
carriage means longitudinally movable on said stand;
cradle means mounted on said carriage means for supporting the article to be inspected in a longitudinally aligned position with the stand;
an elongate inspection device longitudinally fixed on said stand in a position aligned with the bore of said article;
said device having at least one caddy means for guiding the device within the article bore;
drive means for moving said carriage means on said stand so that the article is moved relative to and in telescopic relationship to said inspection device;
said stand having a total combined length at least substantially equal to the combined length of the bore of said article and said inspection device;
whereby the operator can remain stationary at the site of the inspection device throughout the inspection operation.

3. The apparatus of claim 2 wherein:
at least one saddle means vertically supported on the stand for slidably guiding an intermediate portion of said elongate inspection device positioned outside the article in an aligned positioned with the bore of the article.

4. The apparatus of claim 3 wherein said saddle means is releasably connected to said driving means to be able to move along with the carriage as it approaches the inspection site.

5. Apparatus for inspecting the bore surface of a hollow helicopter blade comprising:
a fixed, longitudinally extending stand having a plurality of spaced longitudinally extending rails;
at least two spaced-apart carriages movably mounted on said rails, said carriages being longitudinally adjustable with respect to the stand to accommodate blades of varying lengths;
cradle means mounted on each of said carriages and transversely adjustable to accommodate blades of varying thicknesses;
an elongate borescope device longitudinally fixed and supported on the stand in a position aligned with the blade bore;
said stand having a total combined length at least equal to the length of the bore of the article and the length of said borescope;
said borescope device having a length at least as long as the length of the bore of said blade;
means for rotatably supporting said borescope device about its longitudinal axis in an aligned position with the bore of said blade;
at least one caddy means mounted on the borescope device for contacting the blade bore and guiding the device therein;
at least one cradle means mounted on the stand for supporting the intermediate portion of said borescope;
said cradle means being movably mounted on the stand rails; drive means for moving said carriages on said stand so that the blade is moved relative to and in telescopic relationship over said borescope;
whereby an operator sighting through the borescope can remain at the viewing station throughout the inspection operation.

6. The apparatus of claim 5 wherein one of said cradles is angularly adjustable about the longitudinal blade axis to accommodate a twist in said blade.

7. The apparatus of claim 5 wherein a seat is mounted to the stand at one end there of to permit the operator to be seated throughout the inspection operation.

* * * * *